Sept. 13, 1927.

H. MILLER

APPARATUS FOR ATTACHING HANDLES TO CLEAT PLATES

Filed June 11, 1923

INVENTOR
Henry Miller
By N. A. Acker
his Attys.

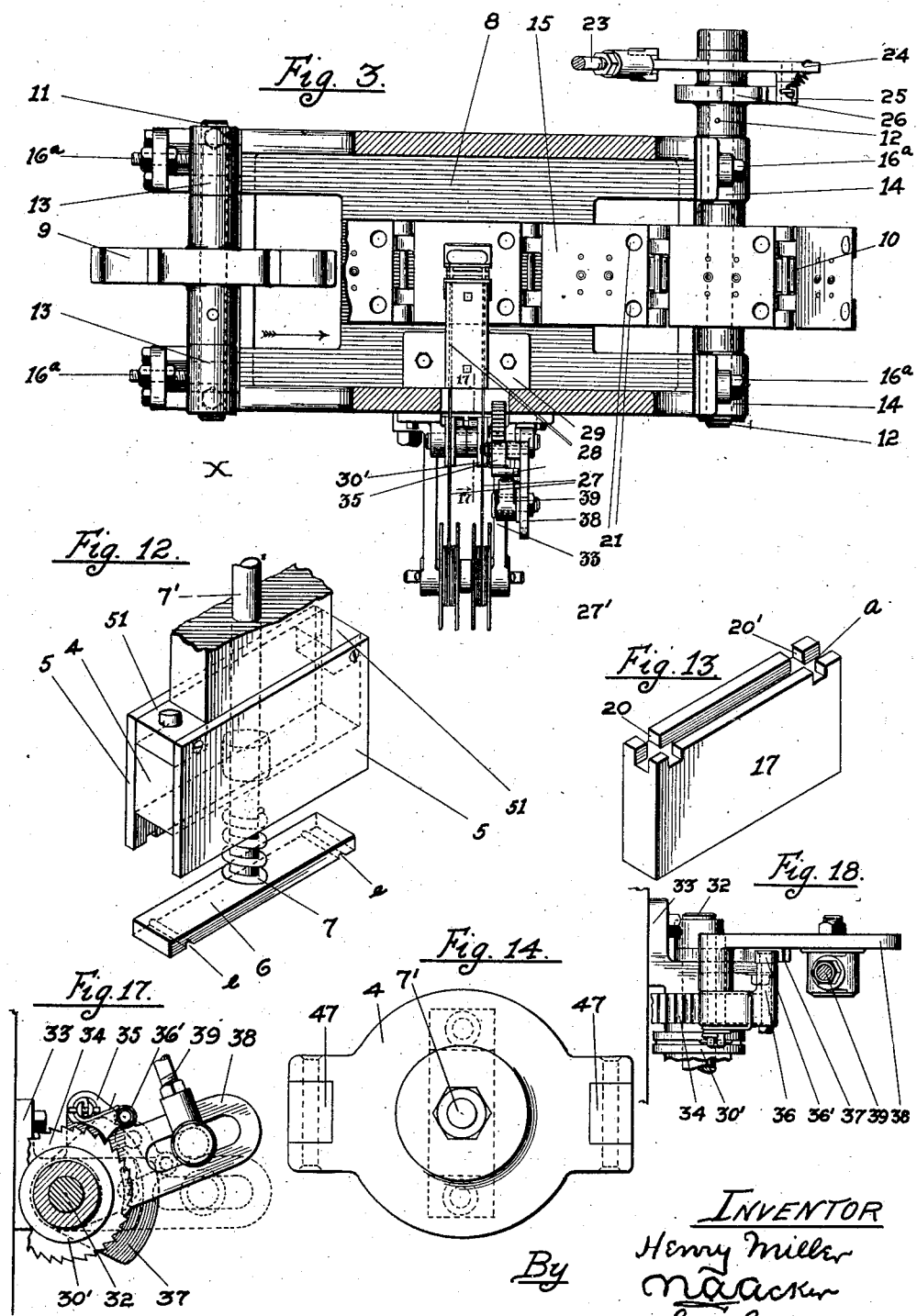

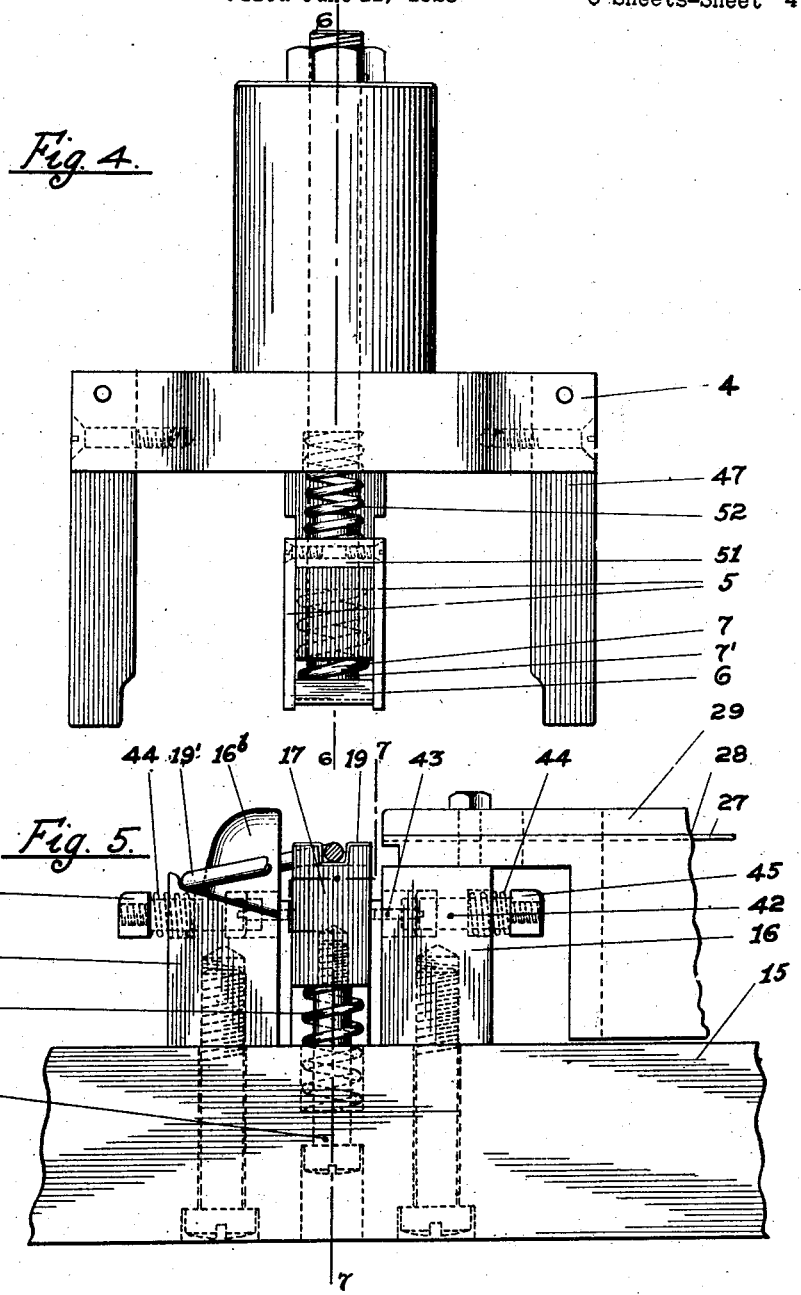

Sept. 13, 1927.  1,642,458
H. MILLER
APPARATUS FOR ATTACHING HANDLES TO CLEAT PLATES
Filed June 11, 1923   6 Sheets-Sheet 5
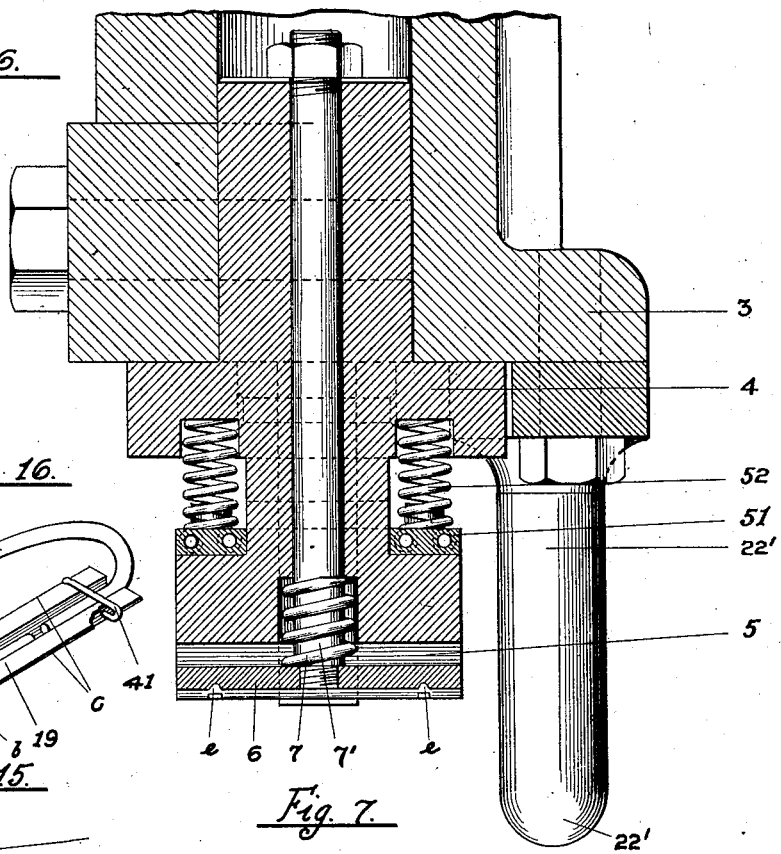
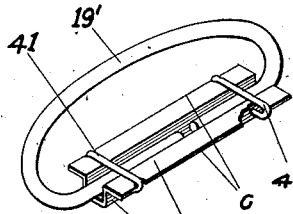
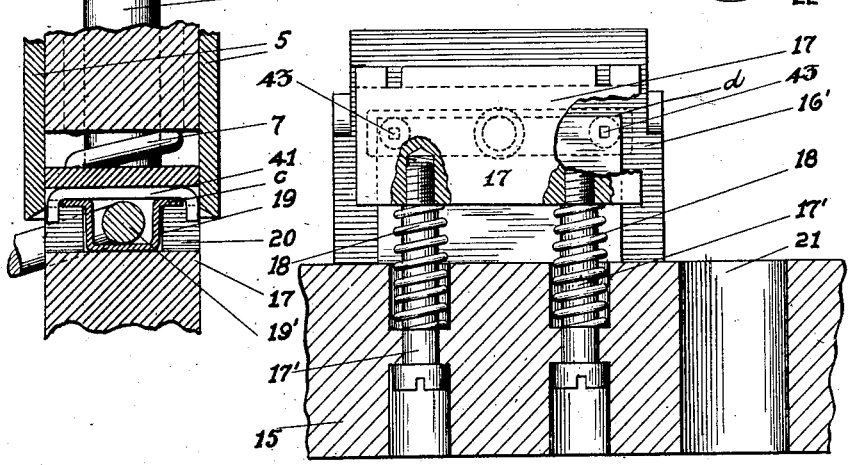
INVENTOR
Henry Miller
By
His Attys.

Sept. 13, 1927.  
H. MILLER  
APPARATUS FOR ATTACHING HANDLES TO CLEAT PLATES  
Filed June 11, 1923   6 Sheets-Sheet 6
1,642,458
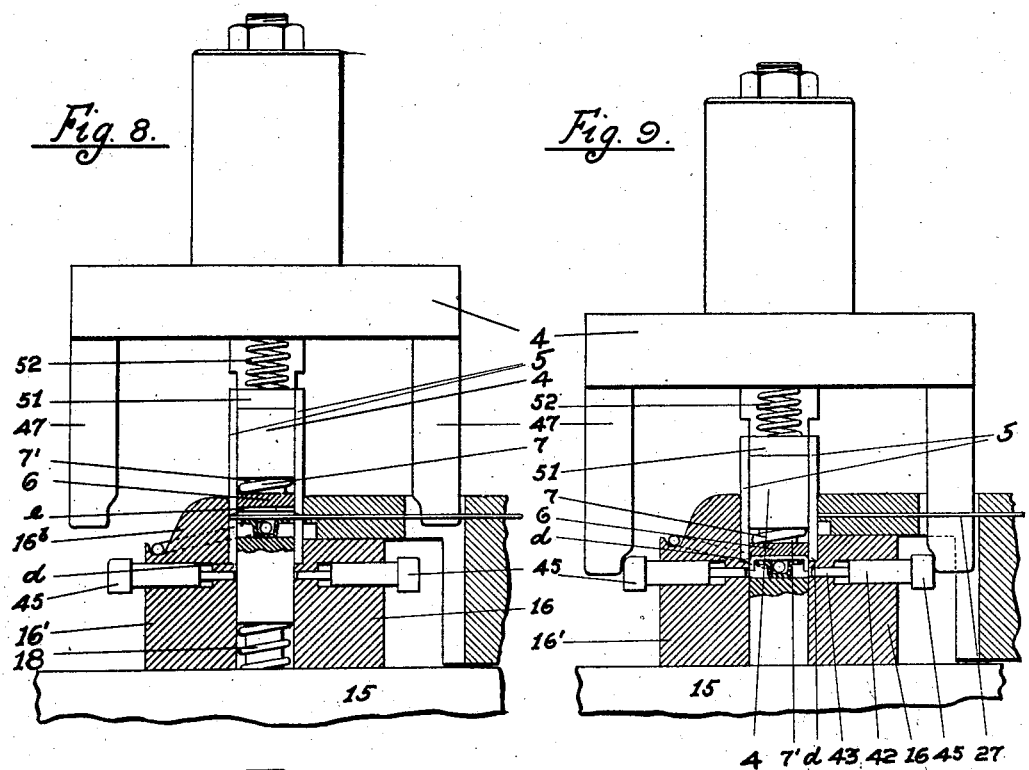
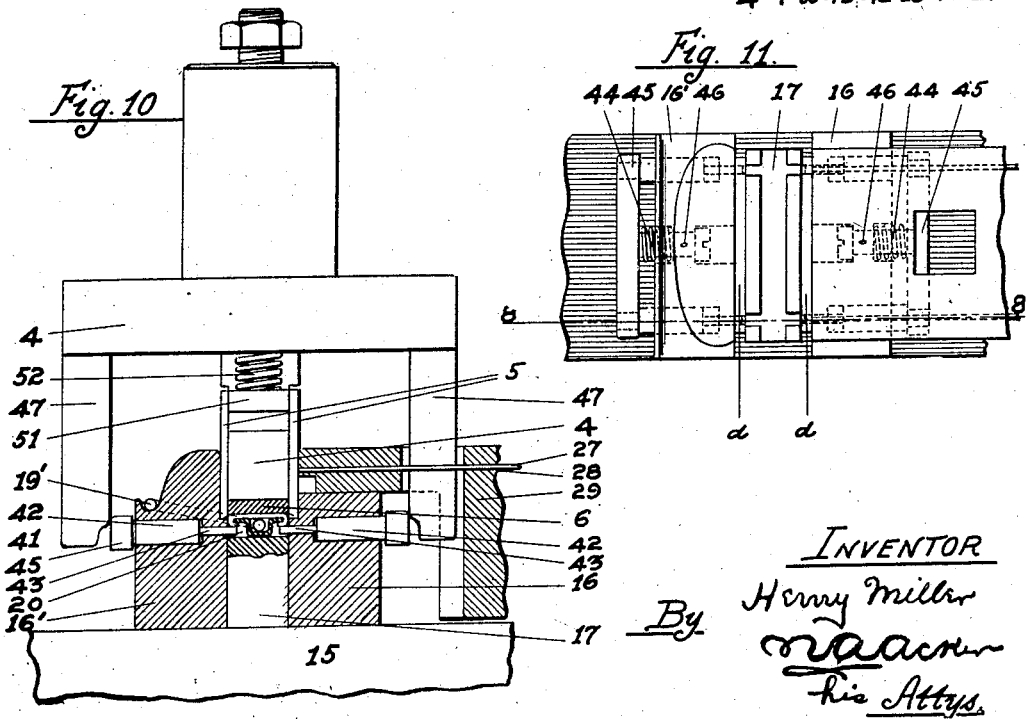
INVENTOR  
Henry Miller  
By  
his Attys.

Patented Sept. 13, 1927.

UNITED STATES PATENT OFFICE.

1,642,458

HENRY MILLER, OF SAN FRANCISCO, CALIFORNIA, ASSIGNOR TO AMERICAN CAN COMPANY, OF SAN FRANCISCO, CALIFORNIA, A CORPORATION OF NEW JERSEY.

APPARATUS FOR ATTACHING HANDLES TO CLEAT PLATES.

Application filed June 11, 1923. Serial No. 644,819.

The hereinafter described invention relates to an apparatus designed more particularly for the carrying out of the invention set forth and described in my pending application Ser. No. 603,837 filed in the United States Patent Office under date of Nov. 28, 1922 re attachment for handles, the present invention relating to means for assembling the handles relative to cleat plates designed for attachment to containers of comparatively large size—as for instance, five gallon containers, the working arrangement of the apparatus being such that the handles are held in position relative to the attaching cleat plates by means of strips of fusible solder which overlie the handle relative to the cleat plate and are united to the said plates for securing the handle in position relative thereto by the free ends thereof being bent or tucked under the flanged side walls of the said cleat plates; whereby the uniting of the handle to the said cleat plate is permitted to be carried out at one point for the shipment of the united handle and cleat plate to another point for attachment to the container, the solder strips employed for holding the handle in position relative to the cleat plates serving as the medium for uniting or attaching the said plate to the wall of the container; the object of the invention being the production of a simple, efficient, practical and durable apparatus for the carrying out of the desired work and one which is capable of a large output per day.

To comprehend the invention reference should be had to the accompanying sheets of drawings where—

Fig. 1 is a view in front elevation, the working parts of the apparatus being illustrated in what may be termed the idle position, said view illustrating the cross head carrying a die member, the means for imparting reciprocating movement to the said cross head, the solder feed mechanism and the conveyor means for intermittently advancing loosely assembled cleats and handles to the uniting mechanism of the apparatus.

Fig. 2 is a side elevation partly broken away disclosing the mechanism set forth in Fig. 1 of the drawings viewed in the direction of the arrow A.

Fig. 3 is a transverse sectional view taken on the irregular line 3—3, Fig. 2 of the drawings, said view disclosing the solder feed mechanism, one of the driving sprockets over which works the endless conveyor and the construction of the conveyor member, the die members associated with each link plate of the conveyor being omitted except for the one associated with the link plate positioned at the assembling station of the apparatus.

Fig. 4 is an enlarged detailed side view of the upper die member carried by the cross head of the apparatus and positioned as disclosed by Fig. 1 of the drawings.

Fig. 5 is an enlarged side view of one of the link plates of the conveyor member illustrating associated therewith the die member carried thereby and disclosed in approximately its correct position relative to the upper die member carried by the cross head of the apparatus, there being disclosed in connection with said view a portion of the frame of the apparatus through which the solder strips are fed.

Fig. 6 is a vertical sectional view taken on the line 6—6, Fig. 4 of the drawings and illustrating the position of the die member relative to the cross head of the apparatus.

Fig. 7 is a vertical sectional view taken on the irregular line 7—7, Fig. 5 of the drawings and illustrating the construction of the lower die member and the relative operative position thereof in relation to the upper die member illustrated by Fig. 6 of the drawings.

Figs. 8, 9 and 10 are longitudinal sectional views taken on the line 8, Fig. 11 of the drawings and illustrating diametrically at three successive stages of operation of the die members during one cycle or during the operation of applying solder strips and attaching the same to the cleat to secure the handle thereto.

Fig. 11 is a plan view of a lower die member positioned with respect to its link plate of the endless conveyor, the cleat plate and handle disclosed by Figs. 8, 9 and 10 being removed.

Fig. 12 is an isometric projection of the upper die member illustrating the mounting of the wire solder severing members and disclosing the center pad member associated therewith in lowered position.

Fig. 13 is an isometric projection of the center pad of the lower die members illustrating its upper portion shaped to receive the cleat plate to which a handle is to be secured.

Fig. 14 is a plan view of the upper die member disclosed by Figs. 8, 9 and 10 of the drawings.

Figure 1:
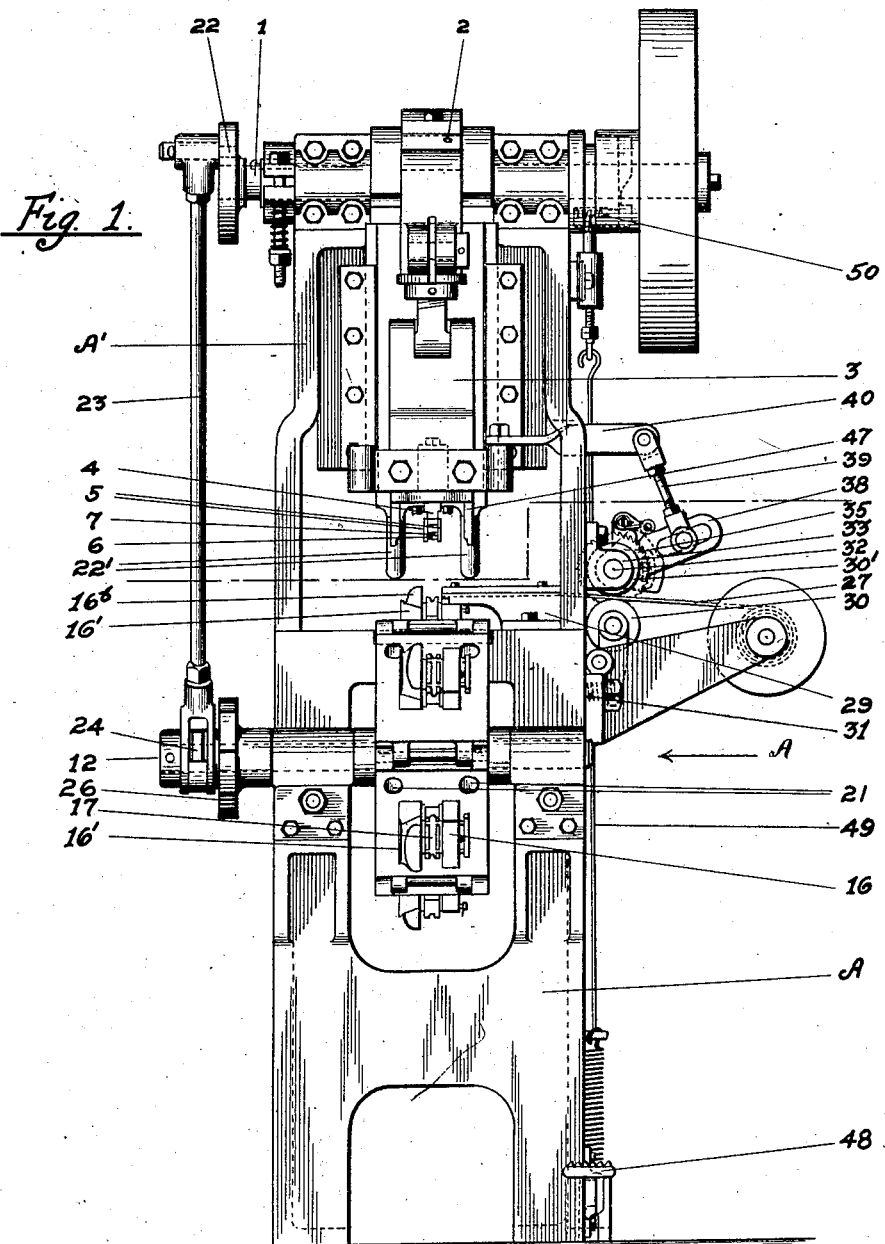

Fig. 15 is an enlarged detailed sectional view of the upper and lower die members, illustrating a cleat plate and handle therefor positioned relative to the lower die member, the solder strips arranged transversely of the cleat plate and severed from the wire solder by the upper die member and bent thereby at right angles to the cleat plate and prior to the ends thereof being tucked beneath the flanged side walls of the cleat plate.

Fig. 16 is an isometric projection of an assembled handle and cleat plate.

Fig. 17 is a detailed view in side elevation of the mechanism which controls the feed of the wire solder and, Fig. 18 is a plan view of the wire solder feed mechanism disclosed by Fig. 17 of the drawings.

In the drawings, the letter A is used to designate any suitable form of a frame structure capable of sustaining the working parts of the apparatus, within the upper structure A' of which works within suitable bearings a transversely disposed shaft 1 upon which is mounted a crank 2 with which is connected for operation a cross-head 3, which said cross-head works within suitable guideways formed within the upper structure A' of the frame A. The said cross-head carries a die member which in the present case comprises a punch block 4, shear plates 5 attached to opposite faces of the punch block 4, the lower cutting edges of the said plates being inwardly bevelled, and a pad plate 6 mounted between said plates 5 and the stem of which extends upwardly through the block 4 and is normally held downwardly by the pressure of the spring 7, see Figs. 1, 2, 4, 6, 12 and 15, as well as in diagrammatic views 8, 9 and 10.

Within the frame structure A is mounted a bed plate 8 over which works an endless conveyer, said conveyer working over sprockets 9, 10 secured to transverse shafts 11—12 working in bearings 13, 14 held to the said plate by securing bolts 16ª carried at the ends of the frame structure, and the said endless conveyer is driven intermittently in the manner hereinafter set forth.

The endless conveyer in the present case comprises a series of hingedly connected or articulated link plates 15, each plate having upwardly projected therefrom die blocks 16—16' arranged in spaced relation, Figs. 1, 2, 3, 8, 9, 10 and 11 of the drawings.

Between the blocks 16 and 16' is mounted for vertical movement a die pad 17, which pad is held to its link plate 15 by means of bolts 17' which pass through openings in the said plate 15 and screw into the lower end portion of the pad 17, there being mounted on each bolt 17' a spring 18 interposed between the lower end of the pad 17 and the link plate 15. The upper face of the pad 17 is shaped to receive a cleat plate 19 to which the handle 19' is to be secured, the shape of the upper face of the said pad 17 being clearly illustrated by Figs. 1, 5, 11, 13 and 15 of the drawings, the transversely disposed recess or channel of the said pad 17 being intersected by the spaced cutouts 20 and 20', which are provided to give clearance passage for the bending plungers hereinafter referred to.

The transversely disposed channel $a$ Fig. 13 of the drawings formed in the upper face of the pad 17 receives the depressed portion $b$ Fig. 16 of the drawings of the cleat plate 19. The groove or channel formed by the depressed portion $b$ of the cleat plate receiving the terminal ends of the handle 19' to be applied thereto, and when the terminal end portions of the looped handle 19' are fitted or placed by an operator within the channel, portion $b$ of the cleat plate 19, the looped section or portion of the said handle 19' embraces an upwardly projected extension 16ᵇ of the block 16'; which projecting portion 16ᵇ of the said block is properly shaped to permit of the looped portion of the handle 19 to freely slide thereover and hold the handle in its position relative to the cleat plate 19, Figs. 5, 8, 9 and 10 of the drawings. Each link plate 15 has formed therein the vertically disposed pilot holes 21 which are adapted to receive the pilot pins 22' carried by the cross-head 3, when the said cross-head is moved into its lowermost position, the said pilot pins 22' moving into the pilot openings 21 of a link plate positioned therebelow and in axial alignment therewith, serve to center or properly register and hold the link plate 15 in fixed position during the operation of applying solder strips to the cleat plate 19 positioned relative to its pad 17.

Figure 2:
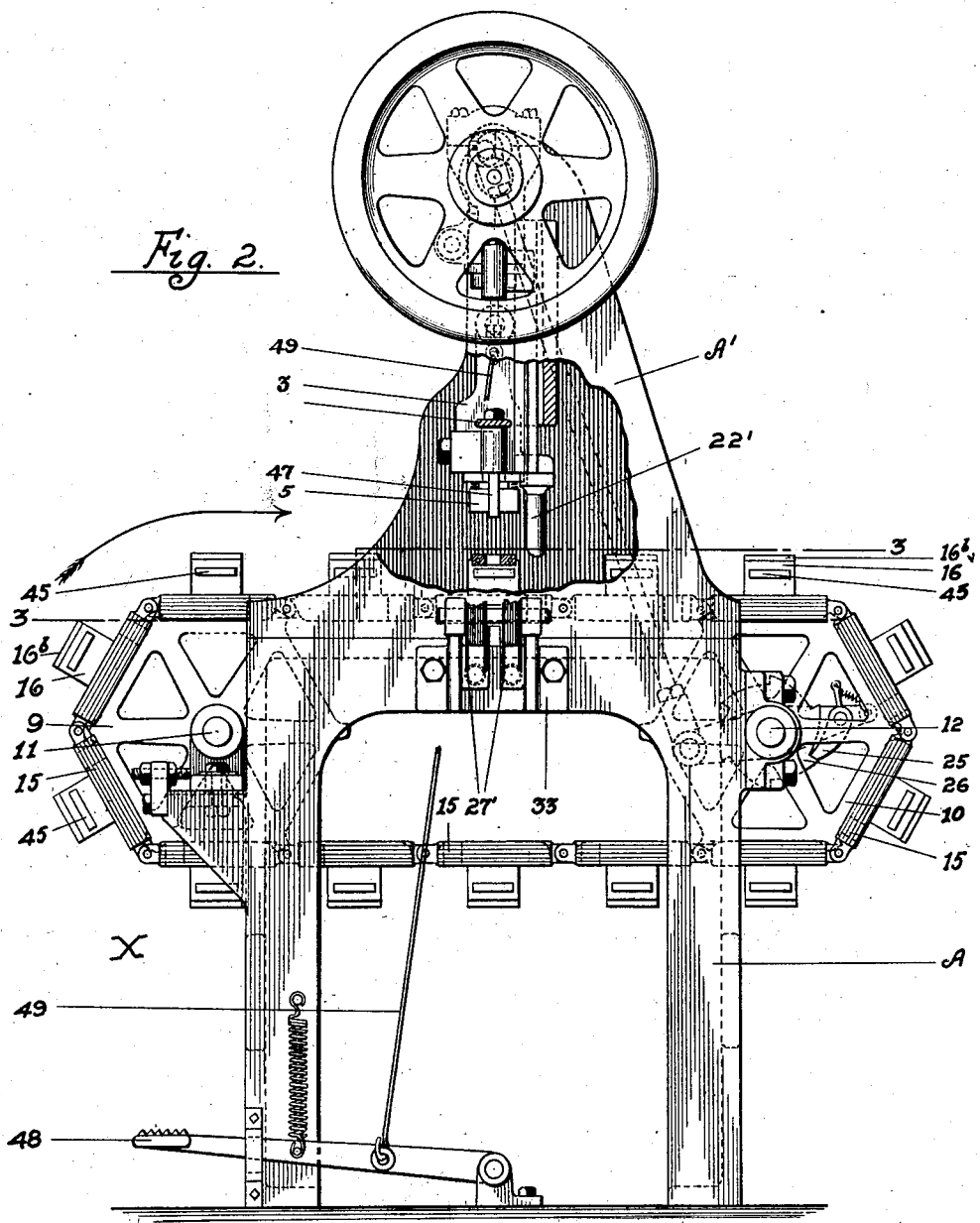

The endless conveyer is driven intermittently from the continuous rotary movement of the shaft 1 through the medium of a crank 22 attached to one end of the shaft 1, from which crank is downwardly extended a connecting rod 23, which at its lower end connects with a rocker arm 24 secured to the transverse shaft 12, Figs. 1, 2 and 3 of the drawings. The free end of the rocker arm 24 carries a spring held pawl 25 which engages with the teeth of a ratchet wheel 26 attached to the shaft 12, so that from the continuous rotating shaft 1 intermittent motion is transmitted to the shaft 12 during the working moments of the apparatus.

To one side of the frame A and centrally thereof and positioned at what may be termed the assembling station of the apparatus, there is arranged the wire solder feed mechanism, which, in the present case, feeds two spaced strips of wire solder 27 from the solder reels 27', Fig. 3 of the drawings, the wire solder strips 27 feeding into the apparatus through the spaced guide bores 28 formed within a bracket 29 secured to and upwardly projecting from the bed 8 of the frame structure, Figs. 1, 3 and 5 of the drawing.

The wire solder is fed into the apparatus and through the guide bores 28 of the bracket 29 by means of a plurality of pairs of feed rolls 30 and 30', which frictionally engage with the wire solder, the lower roll 30 of each pair of feed rolls being held upwardly pressed by means of a spring 31, the said feed roll 30 being an idle roll. The upper feed rolls 30' are secured to a short longitudinally disposed shaft 32 mounted within bearings of a bracket 33, and to the shaft 32 is mounted a ratchet 34 which is engaged by a spring held pawl 35 for imparting a step rotation to the said shaft 32 when the strip actuating mechanism is thrown into operation as hereinafter set forth.

The pawl 35 carries an angular extension 36, to the free end of which is attached a roll 36' which normally rests upon the face of a cam plate 37 fixed to the bracket 33. The pawl 35 is secured to and carried by a rocker plate 38 loosely mounted upon the shaft 32, the said plate being slotted to receive the lower end of a connecting link 39, which link at its free end is connected to a projection 40 secured to and outwardly extended from the cross-head 3, Figs. 1, 3, 17 and 18 of the drawings. The inward feed of the wire solder is continued during the engagement of the pawel 35 with the ratchet 34 during the downward stroke of the cross head 3 until the end of the wire solder strip abuts against the inner face of the projecting portion 16ᵇ of the block 16', Fig. 8 of the drawings, by which time the roll 36' will have been carried onto such portion of the fixed cam plate 37 as to lift the pawl 35 out of engagement with the teeth of the ratchet plate 34, thereby arresting further inward feed movement of the strips of wire solder due to the disengagement of the said pawl 35 with its ratchet plate 34. Further continued downward movement of the cross-head 3 causes the shear plates 5 of the upper die to cut or sever the strips of wire solder which at said time overlie the face of the cleat plate 19, as to free the same and to bend the ends of the wire strip projecting beyond the flange walls c of the cleat plate 19, Figs. 8, 9 and 15 of the drawings. This bending of the projecting ends of the cut strips of solder at right angles to the flanged walls c of the cleat plate 19 is produced by the bevelled face given to the lower end of each of the plates 5. In order to hold the cut or severed sections 41 of the wire solder strips 27 to the cleat plate 19, it is required that the projecting ends of the bent down or angular portion of the said severed sections 41 be turned or tucked inwardly beneath the flanged walls c of the cleat plate 19. For this purpose, there is provided the plungers 42, two mounted for inward movement relative to each block 16—16', each plunger terminating in a reduced stem 43, which stem when the plungers 42 are moved inwardly their full distance project beyond the inner face wall of the block 16—16'. The stems 43 of the plungers 42 move within and through the cut-out portions or sections 20 and 20' of the die block 17 and engage with the end extension of the spaced solder pieces 41 and turn or tuck the same beneath the lower face of the flanged walls c of the plate 19. These plungers 42 are normally held outwardly pressed by the springs 44, which bear against the inner face of the cross pieces 45 carrying the plungers 42, Figs. 8, 9, 10 and 11 of the drawings, said cross pieces or bars 45 being held to the spaced blocks 16—16' by slide bolts 46, which bolts are surrounded by the springs 44. The cross bars 45 carrying the plungers 42 are moved inwardly during the downward movement of the cross-head by the engagement therewith of the cam bars 47 downwardly projected from the punch block 4, Figs. 8, 9, 10 and 14 of the drawings.

In the present case, the placing of the operative parts of the apparatus into working association is illustrated as being initially started through the operation of a clutch trip rod 49 and spring held treadle 48, the connecting trip rod 49 of which controls the action of a spring held clutch pin 50, all of which is common in actuating mechanism of this type.

The shear plates 5 of the upper punch member are connected by means of the spacer blocks 51 to which they are bolted, Fig. 12 of the drawings, and the spacer blocks are permitted a yielding motion through the medium of the springs 52 in order that the shear plates 5 may have relative vertical sliding movement with respect to the punch block 4, Figs. 6, and 7 of the drawings. The punch pad 6 of the upper die member is permitted vertical movement, and as before stated its holding position thereof is controlled by the action of the spring 7 which surrounds the lower portion of its stem 7'. Of the mentioned springs, the spring 7 is the stiffest, for the springs 52 must give after the shearing plates have been brought to position where they rest upon the shoulders d of the blocks 16—16', and the tension of the spring 7 sufficient on the shearing plates reaching this position and which is the position after the severing and the right angle bending of the wire strips 41 to enable the pad 6 to continue its downward stroke a predetermined distance to carry the lower die pad 17 into such a position as will place the projecting ends of the severed strips 41 of solder into alignment with the stems 43 of the plungers 42. The effect of the tension of the various springs is clearly illustrated by Figs. 8, 9 and 10 of the drawings, and wherein is disclosed by Fig. 8 that the upper die member has moved to the point of beginning to sever the short lengths of solder from the two strips of wire solder, and it will be noted that all of the springs mentioned must be stiff enough to permit of this operation without flexing. As the solder strips 41 are severed, the center pad of the upper die, having lateral grooves $c$ in the end face thereof to embrace the positioned strips 41 of the solder, clamps the severed pieces of solder and holds them securely on the top of the cleat 19 resting on the center pad of the lower die, the parts now continuing downward, the bevelled inner edges of the severing die plates act to bend the severed pieces of solder at right angles to the flange walls $c$ of the cleat plate 19, as indicated in Figs. 9 and 15 of the drawings, and which constitutes the second position of movement. As the pieces of severed solder strips 41 are clamped and the projecting ends thereof bent at right angles to the flange wall $c$ of the cleat plate 19, the center pad of the upper die has bearing contact with the center pad of the lower die with the cleat plate held therebetween. However, since the spring supporting the center pad of the lower die is the weakest of the set of springs, as soon as the top pad makes contact with the lower pad, the said pad is depressed through the continued downward movement of the cross head carrying the shearing plates 5 to the position indicated by Fig. 9 of the drawing, at which point the lower edges of the severing dies or plates 5 are in contact with the ledges or shoulders on the inner faces of the severing plates on the face of the blocks 16—16', which contact stops further downward movement of the severing dies or plate 5, and at this point lower end of the center pad 17 of the lower die is resting on the top face of the link plate with which it is associated and hence cannot move any further, the only movement now possible is that left between the center pad 4 of the top die and the spring housing directly above it, which movement is just sufficient to permit the end of the cross head stroke to place the parts into position indicated by Fig. 10 of the drawings.

By reference to Fig. 9 of the drawings, it will be noted that the downward bend of the severed solder pieces 41 extend slightly past the ends of the tucking plungers 42, that give to the projecting ends of the said severed strip 41 the final bend so as to clinch or tuck the same beneath the flanged walls $c$ of the handle cleat 19, at which time the cam bars 47 carried by the upper die structure are just contacting with the cross bars 45 that control the movement of the tucking plungers 42, so that the final downward movement to the position disclosed by Fig. 10 of the drawings completes the operation by forcing inwardly to full distance the plunger 42 for giving the final bend to the ends of the severed solder pieces 41 and clinches them securely relatively to the cleat plate 19.

Assuming the machine to be in operation, the work of assembling and securing the handles to the cleat plates is as follows:

An operator position at—say the feed station designated by the letter X,—Figs. 2 and 3 of the drawings, and the endless conveyor moving in the direction of the arrow, Fig. 2 of the drawings, as a link plate 15 of the conveyor with its projecting spaced blocks 16—16' is advanced into position adjacent the operator, a cleat plate 19 with a handle 19' loosely applied thereto is placed onto the vertically disposed pad 17 movably held between the blocks 16—16', the looped portion of the handle 19' being fitted over the shaped extension $16^b$ of the block 16' (Fig. 5). As thus placed the cleat plate and loosely assembled handle is advanced by the intermittent travel of the endless conveyer until positioned beneath and in axial alignment with the upper die member of the apparatus, at which position or assembling station of the apparatus the lower die member stands at rest during the solder applying and securing operation. With the parts thus positioned the solder feed mechanism is thrown into action and two strips of wire solder advanced a given distance to overlie the exposed face of the cleat plate, Fig. 8 of the drawings. During this action the cross-head 3 with its associated parts is on its downward stroke and the first action is the placing of the pilot pins 22' into engagement with the pilot openings 21 to maintain the link plate of the conveyer properly positioned relative to the assembling station. The continued downward movement of the cross-head causes the shearing plates 5 to sever the portion of the strips 27 of wire solder overlying the cleat plate, leaving thereon spaced solder strips 41, the projecting ends thereof by the shearing edges of the said plates being bent downwardly at right angles to the flanged side walls $c$ of the cleat plate 19, Figs. 9 and 15 and 16 of the drawings, the lower end of the shearing plates 5 being carried against the inner shoulders $d$ (Fig. 7) of the blocks 16—16', and further downward movement thereof is arrested, it being understood that the feed movement of the wire solder is discontinued just prior to the shearing action of the plates 5—5, as hereinbefore set forth. However, the cross-head continues its downward stroke for a limited distance, the pressure of the springs 7 acting against the pad 6 causing the said pad to force downward the pad 17, until the flanged ends of the cut solder strips 41 stand in alignment with the openings within the blocks 16—16' through which the plungers 42 work, at which time the lower end of the pad 17 rests upon the link plate 15. The plungers 42 are now forced inwardly their full distance by the action of the cam plates 45 depending from the punch block 4 against the cross bars 45' which connect the plungers 42, causing the stems thereof to bend inwardly the lower projecting end of the positioned solder pieces 41, until the same are securely locked or tucked under the flange walls c of the handle cleat plate 19, Fig. 10 of the drawings—which is the final act of securing the handle 19' to the said handle cleat plate 19. The cross-head having now completed its full downward stroke and the various working associated elements having performed their respective operations relative to properly securing the cut strips 41 of solder for holding the handle to its cleat plate, one cycle of operation is completed and the cross-head is moved upwardly to release the pilot pins 22 from engagement with the link plate of the conveyer, the elements 5, 6, 17 and 42 being restored to normal position by the action of the springs 52, 7, 18 and 44 respectively, while at the same time as the roll 36' is moved upward from off the inclined portion of the cam 37 by the pull of the connecting rod 39 onto the slotted oscillatory lever 38 on the return stroke of the cross-head 3, the action of the spring 35' throws the pawl 35 into engagement with the rack 34 for controlling the feeding action of the wire solder strips on the next down stroke of the cross-head. The step movement imparted to the endless conveyer, during the return of the parts to normal position, carries the link plate with the assembled handle and cleat plate from the assembling station of the apparatus toward the discharge end of the machine, at which point the assembled handle and cleat plate are delivered from the conveyer.

While the apparatus has been described and illustrated in its preferred embodiment, I do not wish to be understood as limiting or restricting the same to such details of construction, but on the contrary desire to claim the invention as broadly as the state of the art will warrant.

Having thus described my invention, what I claim as new and desire to protect by Letters Patent of the United States, is:—

1. An apparatus for securing handles in fixed relation to cleats for attachment to containers, the same comprising means for receiving and advancing loosely positioned handles and cleats to an assembling station, devices situated adjacent said station for advancing strips of solder to overlie the positioned handle and cleat, reciprocating means for severing said strips of solder and flanging the projecting ends thereof at right angles to the flanged walls of the cleat, and devices adapted to tuck or bend the flanged end of said wire strips under the walls of the cleat.

2. An apparatus for holding handles in fixed relation to cleats for attachment to containers, the same comprising inter-connected associated working instrumentalities adapted for receiving and advancing handles and cleats loosely assembled to an assembling station, applying at said station in spaced relation strips of solder to overlie said handle and cleat, severing the positioned strips of solder and flanging the ends thereof at right angles to the flanged walls of the cleat and finally tucking the projecting ends of the severed strips beneath said flanged walls and mechanism for actuating said associated instrumentalities in timed relation.

3. An apparatus for holding handles in fixed relation to cleats for attachment to containers, the same comprising a frame structure, an endless conveyer working therethrough and comprising a series of articulated link plates each carrying a die member composed of upwardly projected spaced block members and a vertically movable spring held member mounted therebetween, said pad member having a head provided with a transverse seat adapted to hold a cleat plate and said seat intercepted by a plurality of longitudinally disposed cut-outs, one block member of said die shaped to receive the looped portion of a handle, a plurality of spring held tucking plungers movably mounted within each of the die blocks, means for imparting intermittent movement to the endless conveyor, an upper die composed of independent vertically movable spring held members comprising shear plates and a pad mounted therebetween, said die member being actuated at an assembling station common to all of the die members of the endless conveyor, means actuated adjacent the assembling station of the apparatus for controlling the feed of strips of wire solder to overlie a positioned cleat and handle when a die of the endless conveyer is positioned relative to said assembling station, mechanism for actuating the upper die member to first cut the strips of wire solder to flange the ends thereof relative to the flanged held cleat and depress the pad of the conveyor link plate die to position the projecting ends of the flanged wire strips in alignment with the tucking plungers, and devices carried by said actuating mechanism to move inwardly the said plungers to turn the projecting end of the cut strips beneath the flange walls of the held cleat.

4. In an apparatus for the described purpose, the combination with an endless conveyor composed of a plurality of articulated link plates, means for imparting intermittent movement to said conveyor, a die carried by each link plate comprising a pair of projecting blocks and a spring held member vertically movable therebetween and having a head shaped to receive and hold a cleat plate, one of the blocks being shaped to receive the looped portion of a handle, and spring held plungers movably mounted within the blocks of said dies for the tucking of the end of the severed strips of wire solder beneath the flanged walls of the held cleat during the operating of the apparatus.

5. In an apparatus for the described purpose, the combination of an endless conveyor composed of articulated link plates each supporting and carrying a die member for the holding of loosely assembled handles and cleats, an upper die member situated at the assembling station of the apparatus and adapted to cooperate with a lower die member positioned at said station for the severing of strips of wire solder positioned to overlie the cleat and flanging the ends thereof at right angles to the flanged wall of said cleat, and means carried by the lower die member for tucking the flanged ends of the severed strips of solder beneath the flanged walls of the cleat.

6. In an apparatus for the described purpose, the combination with a reciprocating die member comprising a series of spring held vertically movable elements situated at an assembling station of the apparatus, an endless conveyor composed of articulated link plates each carrying a lower die composed of a plurality of fixed spaced members and a spring held member vertically movable between the fixed members and adapted to hold a cleat plate with a handle loosely assembled relative thereto, means adjacent the assembling station for feeding strips of wire solder to overlie the cleat with an assembled handle when positioned at the assembling station and devices carried by the fixed members of said die member for tucking the ends of the wire strips when severed by the upper die member beneath the flanged walls of the cleat.

7. In an apparatus for the described purpose the combination with an endless traveling conveyor composed of a series of articulated link plates, each carrying a die member adapted to hold a cleat and handle loosely assembled, means for positioning strips of solder to overlie the cleat when the carrying die thereof is positioned at an assembling station of the apparatus, means disposed at the assembling station for co-operation with the lower die for actuating tucking means to place the projecting ends of the wire strips beneath the flanged walls of a held plate.

8. In an apparatus for the described purpose, the combination with an upper reciprocating die member, of a lower die member adapted to hold a cleat and handle in loosely assembled position, means for positioning strips of solder to overlie a positioned cleat and handle, and means movably mounted relative to the lower die and thrown into action by the movement of the upper die member for tucking the projecting ends of the wire strips beneath the flanged walls of the held cleat.

9. In an apparatus for the described purpose, the combination with a vertically reciprocating cross head, of a die carried thereby composed of a plurality of spring held vertically movable members, a lower die member comprising spaced blocks and a spring held member vertically movable therebetween with which the upper die member cooperates, means for positioning strips of solder to overlie a cleat positioned on the lower die members, and means operated by the movement of the cross head for tucking the projecting ends of the solder strip beneath the flanged walls of a held plate.

10. In an apparatus for the described purpose and in combination therewith, an endless conveyor composed of a plurality of articulated link plates each plate of which carries a die provided with a spring held vertically movable member having a head adapted to receive a cleat with a handle loosely assembled relative thereto, spring held devices carried by each of said die members for tucking the projecting ends of applied solder strips beneath the flanged walls of a held cleat when the said die is positioned at the assembling station of the apparatus, and means for actuating said tucking devices.

11. In an apparatus for the described purpose, the combination with an endless conveyor composed of articulated link plates, each of which carries an upstanding die member and provided with a pilot opening, a reciprocating cross head situated at an assembling station of the apparatus and carrying a die member adapted to cooperate with the die member of the endless conveyor when positioned in axial alignment therewith, and a pilot pin carried by the reciprocating cross head adapted to move into the pilot opening of the link plates to position the die thereof in axial alignment with the upper die carried by the cross head.

12. In an apparatus for the described purpose, the combination with a lower die composed of spaced fixed members and a vertically disposed spring held member movably mounted therebetween, said member having a head provided with a transversely disposed channel intercepted by a plurality of longitudinally disposed cut-outs, a plurality of spring held reciprocating tucking devices mounted within the fixed members of the die, solder feed means for applying strips of solder above the movable member of the die when holding a cleat with a handle loosely assembled relative thereto, and mechanism for actuating the tucking devices.

13. An apparatus for the described purpose, the same comprising a reciprocating upper die member, an endless conveyor composed of articulated links each carrying a die member, wire solder feed mechanism, tucking devices carried by each die member of the conveyor, and inter-connected mechanism for actuating the endless conveyor, the upper die, the solder feed and the tucking devices in timed relation.

In testimony whereof I have signed my name to this specification.

HENRY MILLER.